US010994277B2

(12) United States Patent
Starr et al.

(10) Patent No.: US 10,994,277 B2
(45) Date of Patent: May 4, 2021

(54) ENVIRONMENTAL CONTROL SOLUTION FOR CLINICAL ANALYZER MODULE

(71) Applicant: Siemens Healthcare Diagnostics Inc., Tarrytown, NY (US)

(72) Inventors: Michael Starr, Brewster, NY (US); Dimitri Shishkin, Whippany, NJ (US); Shriram Patel, Saddle Brook, NJ (US); Beri Cohen, Hartsdale, NY (US); William Carpenter, Stony Point, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 235 days.

(21) Appl. No.: 16/319,296

(22) PCT Filed: Jul. 19, 2017

(86) PCT No.: PCT/US2017/042940
§ 371 (c)(1),
(2) Date: Jan. 18, 2019

(87) PCT Pub. No.: WO2018/017769
PCT Pub. Date: Jan. 25, 2018

(65) Prior Publication Data
US 2019/0283030 A1    Sep. 19, 2019

Related U.S. Application Data

(60) Provisional application No. 62/365,307, filed on Jul. 21, 2016.

(51) Int. Cl.
*B01L 7/00* (2006.01)
*G01N 35/00* (2006.01)
*G05D 23/19* (2006.01)

(52) U.S. Cl.
CPC ............... *B01L 7/00* (2013.01); *G01N 35/00* (2013.01); *G01N 35/00584* (2013.01);
(Continued)

(58) Field of Classification Search
CPC ............... B01L 7/00; B01L 2300/0627; B01L 2300/1844; B01L 2300/1894;
(Continued)

(56) References Cited

U.S. PATENT DOCUMENTS

| 4,708,886 A | 11/1987 | Nelson |
| 2009/0022625 A1 | 1/2009 | Lee et al. |

(Continued)

FOREIGN PATENT DOCUMENTS

| CN | 103119451 A | 5/2013 |
| CN | 103238073 A | 8/2013 |

(Continued)

OTHER PUBLICATIONS

PCT International Search Report and Written Opinion dated Nov. 13, 2017 (12 Pages).

(Continued)

*Primary Examiner* — Jennifer Wecker
*Assistant Examiner* — Michael Paul Shimek

(57) ABSTRACT

An environmental control system for use in a clinical analyzer module includes an upper deck environmental subsystem comprising a far field sensor, one or more heaters, one or more spine cooling fans, and one or more in-line fluid heat exchangers. The far field sensor is configured to acquire measurements of ambient temperature in the upper deck environmental subsystem. The heaters are configured to generate hot airflow based on the measurements of ambient temperature from the far field sensor. The spine cooling fans are configured to operate in a manner that mixes the hot airflow from the heaters with cool airflow based on the (Continued)

measurements of ambient temperature from the far field sensor. The in-line fluid heat exchangers are configured to heat fluids used in reactions performed on the clinical analyzer module to a constant temperature.

10 Claims, 7 Drawing Sheets

(52) U.S. Cl.
CPC .. *G05D 23/1919* (2013.01); *B01L 2300/0627* (2013.01); *B01L 2300/1844* (2013.01); *B01L 2300/1894* (2013.01); *G01N 2035/00306* (2013.01); *G01N 2035/00326* (2013.01); *G01N 2035/00346* (2013.01)

(58) Field of Classification Search
CPC ............. G01N 35/00; G01N 35/00584; G01N 2035/00306; G01N 2035/00326; G01N 2035/00346; G05D 23/1919
See application file for complete search history.

(56) References Cited

U.S. PATENT DOCUMENTS

| | | | |
|---|---|---|---|
| 2009/0064693 A1 | 3/2009 | Matsiev et al. | |
| 2012/0070884 A1* | 3/2012 | Ammann | G01N 35/0098 435/286.1 |
| 2013/0002250 A1 | 1/2013 | Morgan et al. | |
| 2013/0137110 A1* | 5/2013 | Kraihanzel | G01N 35/1011 435/6.12 |
| 2013/0168074 A1 | 7/2013 | Higginbotham et al. | |
| 2013/0243652 A1 | 9/2013 | Nishigaki et al. | |
| 2015/0224503 A1 | 8/2015 | Dulaff | |

FOREIGN PATENT DOCUMENTS

| | | |
|---|---|---|
| EP | 2 891 381 A1 | 7/2015 |
| JP | H-04-190161 A | 7/1992 |
| JP | S61-212766 A | 12/1993 |
| JP | 2009-300286 A | 12/2009 |
| JP | 2012-141253 A | 7/2012 |
| JP | 2013-150623 A | 8/2013 |
| JP | 2016-090345 A | 5/2016 |
| WO | 93/20440 A1 | 10/1993 |
| WO | 2012/012779 A2 | 1/2012 |
| WO | 2014/035804 A1 | 3/2014 |

OTHER PUBLICATIONS

Extended EP Search Report dated Jul. 4, 2019 of corresponding European Application No. 17831835.8, 4 Pages.

* cited by examiner

ENVIRONMENTAL CONTROL SOLUTION FOR CLINICAL ANALYZER MODULE

CROSS-REFERENCE TO RELATED APPLICATION

This application claims priority to U.S. Provisional Patent Application No. 62/365,307 filed on Jul. 21, 2016, the contents of which are herein incorporated by reference in its entirety.

TECHNOLOGY FIELD

The present invention relates generally to controlling temperature of a component of an in vitro diagnostics (IVD) system, and more particularly to manipulating, in a controlled manner, an internal temperature of air and onboard fluids of such a component.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical analyzers (analyzers or analyzer modules) onto which fluid containers, such as tubes or vials, containing patient samples have been loaded. The analyzer extracts a liquid sample from sample vessels and combines the sample with various reagents in special reaction cuvettes or tubes.

Automated clinical analyzers may include clinical chemistry analyzers, automated immunoassay analyzers, or any other type of IVD testing analyzers. Generally, an analyzer performs a series of automated IVD tests on a plurality of patient samples. Patient samples may be loaded into an analyzer (manually or via an automation system), which can then perform one or more immunoassays, chemistry tests, or other observable tests on each sample.

The chemical reactions that comprise the analytical process are sensitive to temperature. A laboratory may experience wide temperature variations within a day, or day to day, due to weather changes or interruptions in heating or cooling of the facility. A given reaction fluid can have a well-controlled starting temperature at some point in its flow path (e.g., by using an in-line heater or a heat exchanger), but the last part of its flow path is usually exposed to the environment due to mechanical restrictions. Without any environmental control, during rest periods of the analyzer operation, this section of the fluid path will equilibrate at the environment temperature, which may be different than the starting temperature, and the first shots of fluid delivered will be at a different temperature than the subsequent ones, which will produce incorrect test results.

Moreover, large clinical analyzers usually have a lower deck housing utilities (e.g., power supplies and other electronic components) that emit a great deal of heat, and an upper deck where the analytical process is conducted. If such variations are allowed to affect the temperature of the fluids delivered during the analytical process, test results may be negatively affected. Immunoassays using separation and wash processes are particularly vulnerable to such variations because of the larger number of fluid deliveries involved, thus multiplying such negative effects.

Therefore, there is a need for an environmental control solution for IVD components that shields its analytical process components from temperature variations of the facility in which the component operates.

SUMMARY

Embodiments of the present invention address and overcome one or more of the above shortcomings and drawbacks, by providing an environmental control system and related techniques applicable to an analysis instrument in an in vitro diagnostics (IVD) environment. Using the technology described herein, the temperature of fluids delivered in the analytical process may be regulated to a narrow range using a combination of fluid heat exchangers and mechanisms for controlling the temperature of the air space in which these fluids flow. The technology produces consistent test results that are independent of the temperature of the facility in which the analyzer operates.

According to some embodiments, an environmental control system for use in a clinical analyzer module includes an upper deck environmental subsystem comprising a far field sensor, one or more heaters, one or more spine cooling fans, and one or more in-line fluid heat exchangers. The far field sensor is configured to acquire measurements of ambient temperature in the upper deck environmental subsystem. The heaters are configured to generate hot airflow based on the measurements of ambient temperature from the far field sensor. These heaters may include, for example, a wash air heater configured to heat a wash used to remove unreacted components and a probe air heater configured to heat one or more probes used to aspirate and dispense fluids. The spine cooling fans are configured to operate in a manner that mixes the hot airflow from the heaters with cool airflow based on the measurements of ambient temperature from the far field sensor. The in-line fluid heat exchangers are configured to heat fluids used in reactions performed on the clinical analyzer module to a constant temperature.

In some embodiments of the environmental control system of claim 1, the system further includes a lower deck environmental subsystem located in a lower environmental subsystem of the clinical analyzer module, one or more inlet fans, and one or more exhaust fans. The inlet fans are configured to draw air from an operating environment of the clinical analyzer module, while the exhaust fans are configured to remove hot airflow from the lower deck environmental subsystem. In some embodiments, the lower deck environmental subsystem further includes one or more lower deck sensors configured to acquire measurements of ambient temperature in the lower deck environmental subsystem. Based on these measurements, speed of the fans in the lower deck environmental subsystem may be activated or the speed of the fans may be adjusted to regulate temperature.

According to another aspect of the present invention, as described in some embodiments, a method of regulating temperature within a clinical analyzer module includes receiving a temperature measurement corresponding to ambient temperature in an upper deck portion of the clinical analyzer module. The upper deck portion includes a probe heater and a wash heater configured to operate at a range of predetermined temperature set-points. If the temperature measurement is above a first threshold temperature value, the probe heater is configured to operate at a predetermined medium probe heater set-point and the wash heater is configured to operate at a predetermined low wash heater set-point. If the temperature measurement is below a second threshold temperature value, the probe heater is configured to operate at a predetermined high probe heater set-point and the wash heater is configured to operate at a predetermined high wash heater set-point.

In some embodiments, the aforementioned method further includes performing a temperature regulation process. During this temperature regulation process, a second temperature measurement is received which corresponds to ambient temperature in the upper deck portion of the clinical analyzer module. If the second temperature measurement is above a second threshold temperature value, a first process is performed that comprises one of (a) activating spine cooling fans in the upper deck portion of the clinical analyzer module; (b) configuring the probe heater to operate at the predetermined medium probe heater set-point; or (c) configuring the probe heater to operate at a predetermined low probe heater set-point and configuring the wash heater to operate at a predetermined wash heater low set-point. However, if the second temperature measurement is below a third threshold temperature value, a second process is performed which comprises (a) deactivating spine cooling fans in the upper deck portion of the clinical analyzer module, (b) configuring the probe heater to operate at the predetermined high probe heater set-point, and (c) configuring the wash heater to operate at a predetermined wash heater high set-point. This temperature regulation process may be repeated at predetermined intervals (e.g., every five minutes).

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to an environmental control system for an analysis instrument in an in vitro diagnostics (IVD) environment. Briefly, in-line fluid heat exchangers or heaters are used in conjunction with mechanisms for controlling the air temperature of the compartments through which the fluidics tubing is routed. This allows the fluid heaters to be mounted at some distance away from the point at which the fluid is dispensed, which is otherwise a considerable technical challenge. This further eliminates the need to flush the fluid lines to eliminate cooled liquid that has traveled past the fluid heaters in the common situation that fluid is not dispensed continuously. Controlling the air temperature within the IVD component to a temperature above the ambient operating range of the component, according to embodiments herein, allows temperature to be maintained by heating alone, without the need for expensive cooling mechanisms. For clarity, embodiments of the present invention are described with respect to a clinical analyzer module; however, it should be understood that the techniques described herein may be similarly applied to other IVD components.

Figure 1:
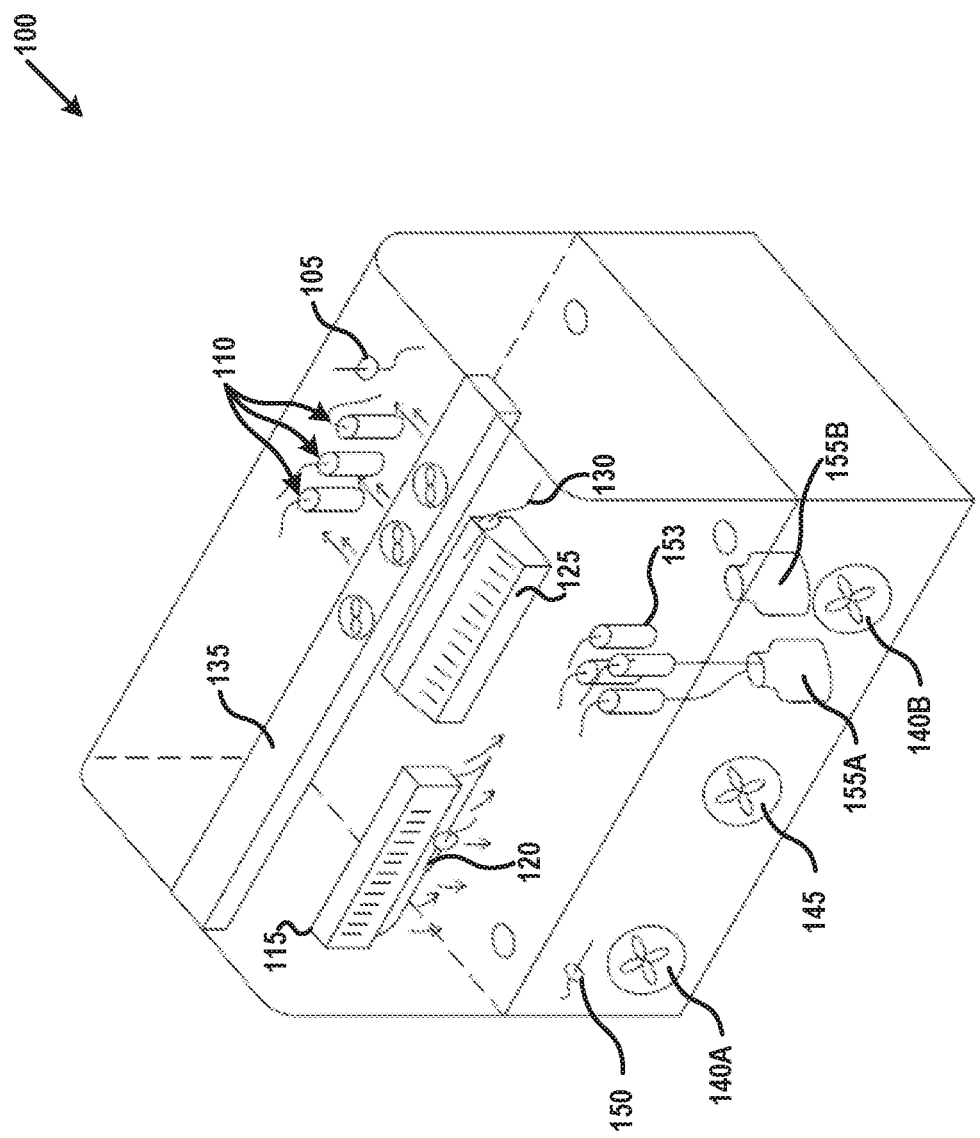
FIG. 1 provides an overview of an environmental control system for a clinical analyzer module, according to some embodiments.

FIG. 1 provides an overview of an environmental control system for a Clinical Analyzer Module 100, according to some embodiments. It should be noted that the various components are illustrated in FIG. 1 as being transparent for illustration purposes; however, in practice, some or all of the components may be made of non-transparent materials. This example conceptually divides the Clinical Analyzer Module 100 into an upper deck environmental subsystem ("Upper Deck") and a lower deck environmental subsystem ("Lower Deck"). The Upper Deck comprises Far Field Sensor 105; Upper Fluid Heaters 110; Wash Heater 115; Wash Sensor 120; Probe Heater 125; Probe Sensor 130; and Spine Cooling Fans 135. The Lower Deck comprises Exhaust Fans 140A, 140B; Inlet Fan 145; Lower Deck Sensor 150; Lower Fluid Heaters 153, and Bulk Liquid Stores 155A, 155B.

Briefly, the various components included in the Upper Deck and Lower Deck are used to bring fluids used in the immunoassay reaction to a constant temperature; control of the air temperature within the compartment(s) through which fluid lines are routed; and control of the air temperature within the compartments in which bulk fluids are stored (and which house the electronics of the Clinical Analyzer Module 100). The air temperature of the Upper and Lower Decks determines how associated electronic components are controlled to adjust the air temperatures.

The Wash Heater 115 illustrated in FIG. 1 heats the wash basin (not shown in FIG. 1). In the Clinical Analyzer Module 100, wash fluids are used to separate the analyte molecules in a patient's sample from the unbound reagents to allow the analyte to be measured accurately. More specifically, in the sample, reagents are added to bind with the analyte to generate a signal of the analyte for measurements. Washing works to separate the bound analyte from the unbound reagent. Unbound reagents are washed away by the heated wash fluids. The outlet air temperature of the Wash Heater 115 is regulated by Wash Sensor 120. As indicated by the arrows, air blows from the Wash Heater 115 down toward the Lower Deck and backwards away from the Wash Heater 115.

The Probe Heater 125 heats the probes used to aspirate and dispense fluids, such as patient samples and reagents. In the Probe Heater 125, outlet air temperature is regulated by the Probe Sensor 130. Airflow from the Probe Heater 125 is directed along the roof of the Clinical Analyzer Module 100 under the Spine Cooling Fans 135. The Spine Cooling Fans 135 pull cool filtered air in from above and mix it with the airflow from the Probe Heater 125.

The Far Field Sensor 105 is an air temperature thermal sensor or thermistor that is used to control the Wash Heater 115, the Probe Heater 125, and the Spine Cooling Fans 135. More specifically, for the Upper Deck, the Far Field Sensor 105 is used to operate the set-points of the Wash Heater 115, the Probe Heater 125 and the on-off function of the Spine Cooling Fans 135. In one embodiment, the target temperature range for the measurements acquired by the Far Field Sensor 106 is 31-35° C.

The Upper Fluid Heaters 110 are in-line fluid heat exchangers that reside inside the temperature controlled air in the Upper Deck and serve to heat the incoming fluid from sources external to the Clinical Analyzer Module 100. The fluid is then distributed by the in-line fluid heat exchangers where needed in the Upper Deck. The warm air in the Upper Deck keeps the fluid lines warm from the Fluid Heaters 110 to the dispense points. The number of individual fluid heaters included in the Fluid Heaters 110 can vary to meet temperature requirements or preferences for a particular analyzer. For example, in one embodiment, 11 individual fluid heaters are used. The Spine Cooling Fans 135 are configured to operate at a constant speed when the temperature measurements of the Far Field Sensor 105 exceed a predetermined threshold value. This process is further described below with respect to FIG. 4.

In the Lower Deck of the Clinical Analyzer Module 100, Inlet Fan 145 draws ambient cool air in from the operating environment and directs it toward electrical components behind it. The Lower Fluid Heaters 153 are in-line fluid heat exchangers that heat the incoming fluid from the Bulk Liquid Stores 155A, 155B.

The Exhaust Fans 140A, 140B remove warmed air, including heat rejected by the reagent compartment thermoelectric devices (TEDs). The Exhaust Fans 140A, 140B can produce a negative pressure in the Lower Deck. Additionally, at high speeds, the Exhaust Fans 140A, 140B draw heat from the Upper Deck, along the Spine Cooling Fans 135 in a warm environment. In some embodiments, the Exhaust Fans 140A, 140B are axial fans (e.g., three-axial fans) and may be 24V DC powered with pulse width modulation (PWM) control capability. In some embodiment, the Exhaust Fans 140A, 140B are equipped with filters to maintain cleanliness of the Lower Deck by filtering out particles. One or more sensors (e.g., Lower Deck Sensor 150) may be used to adjust lower deck fan speeds to minimize noise. These lower deck sensors may monitor heat level from both the central electronics and the reagent compartment of the Clinical Analyzer Module 100.

To prevent any heater included in the Clinical Analyzer Module 100 from overheating during a failure, a thermal fuse cut-off switch (not shown in FIG. 1) may be used. For example, in one embodiment, the Clinical Analyzer Module 100 includes one or more thermal fuses rated with a nominal cut-off temperature of 91° C.

Figure 2:
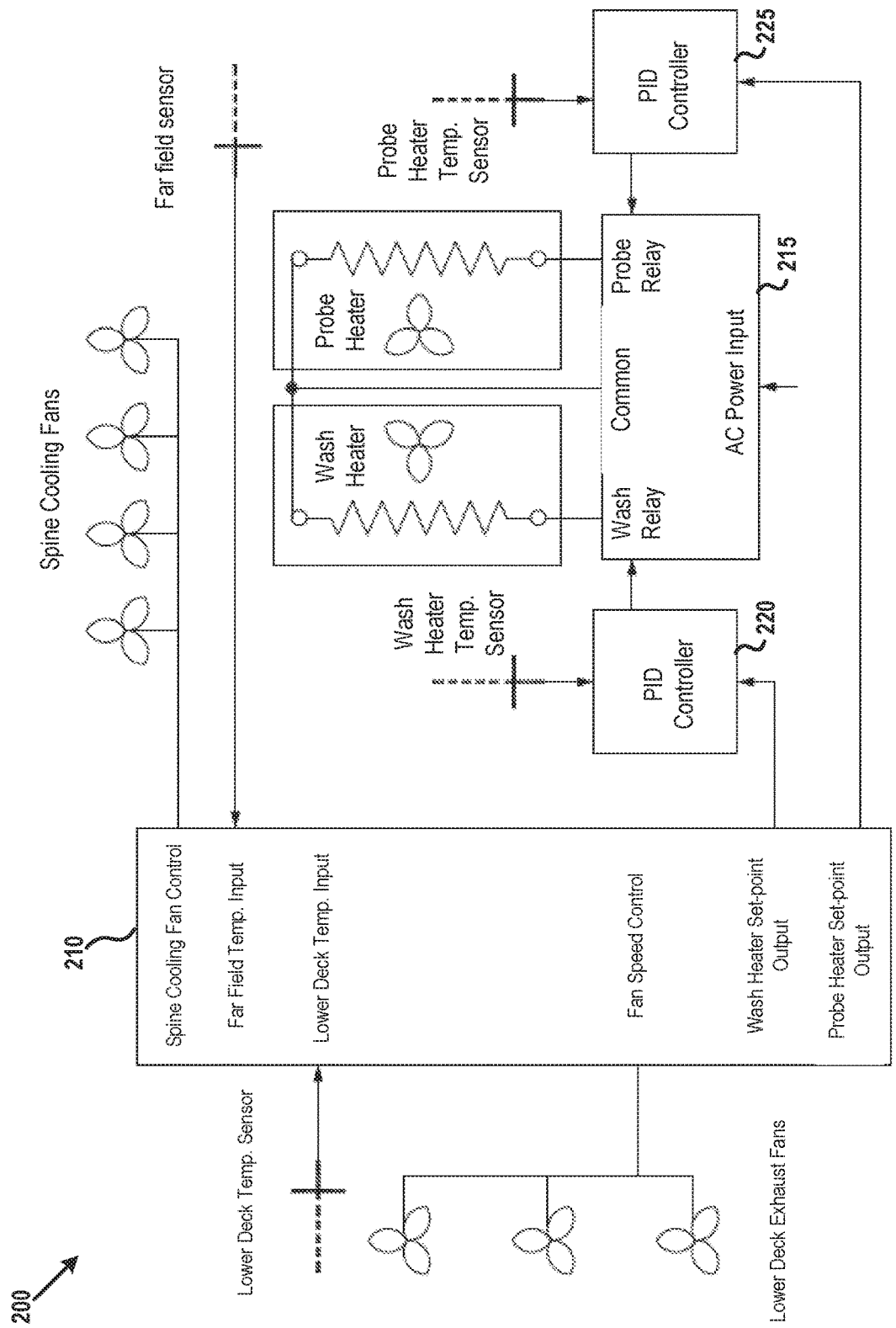
FIG. 2 provides a conceptual view of an environmental control system for a clinical analyzer module, according to some embodiments.

FIG. 2 provides a conceptual view of an environmental control system for a Clinical Analyzer Module 200, according to some embodiments. Controller 210 executes a feedback-regulated subsystem (described below with respect to FIG. 4) which monitors various inputs and adjusts the temperature by controlling, cooling and heating components of the clinical analyzer module. With respect to the Lower Deck of the clinical analyzer module, the Controller 210 monitors temperature using a lower deck temperature sensor. In some embodiments, this lower deck temperature sensor is a thermistor attached to one of the Exhaust Fans 140A, 140B (see FIGS. 3A-3C). The temperature in the Upper Deck is monitored based on measurements from the Far Field Sensor 105. The Controller 210 provides cooling in the Lower Deck and Upper Deck by controlling the Exhaust Fans 140A, 140B and the Spine Cooling Fans 135, respectively.

Continuing with reference to FIG. 2, the environmental control system also includes two Proportional Integral Derivative (PID) Controllers 220, 225. These PID Controllers 220, 225 are used to control the Wash Heater 115 and the Probe Heater 125, respectively. Each PID Controller 220, 225 receives inputs from a local temperature sensor. An AC Power Relay 215 takes outputs from the PID Controllers 220, 225 and relays the outputs to the corresponding heater 115, 125. As shown in the example of FIG. 2, the AC Power Relay 215 is powered by an AC power input and a common line is shared by the Wash Heater 115 and the Probe Heater 125.

Figure 3A:
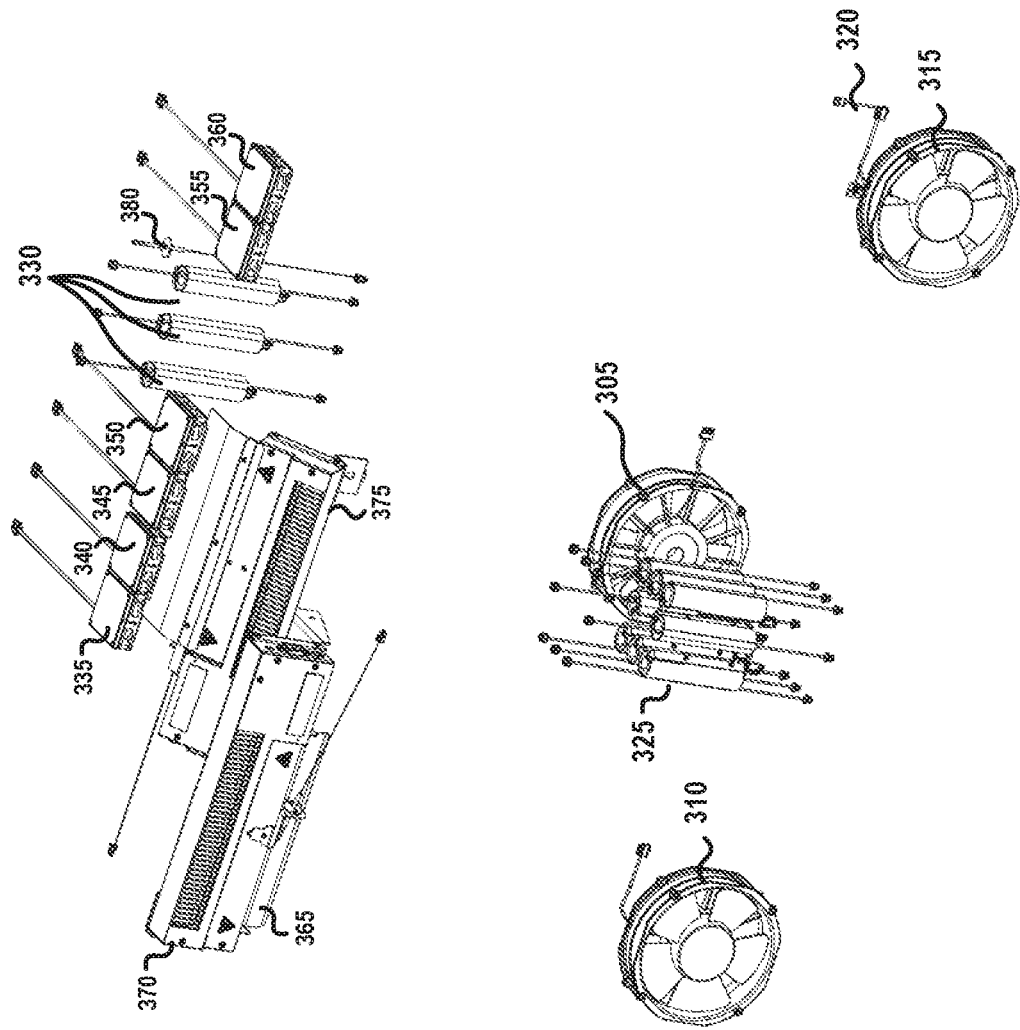
FIG. 3A provides a first schematic view of the environmental control system, according to some embodiments.
Figure 3B:
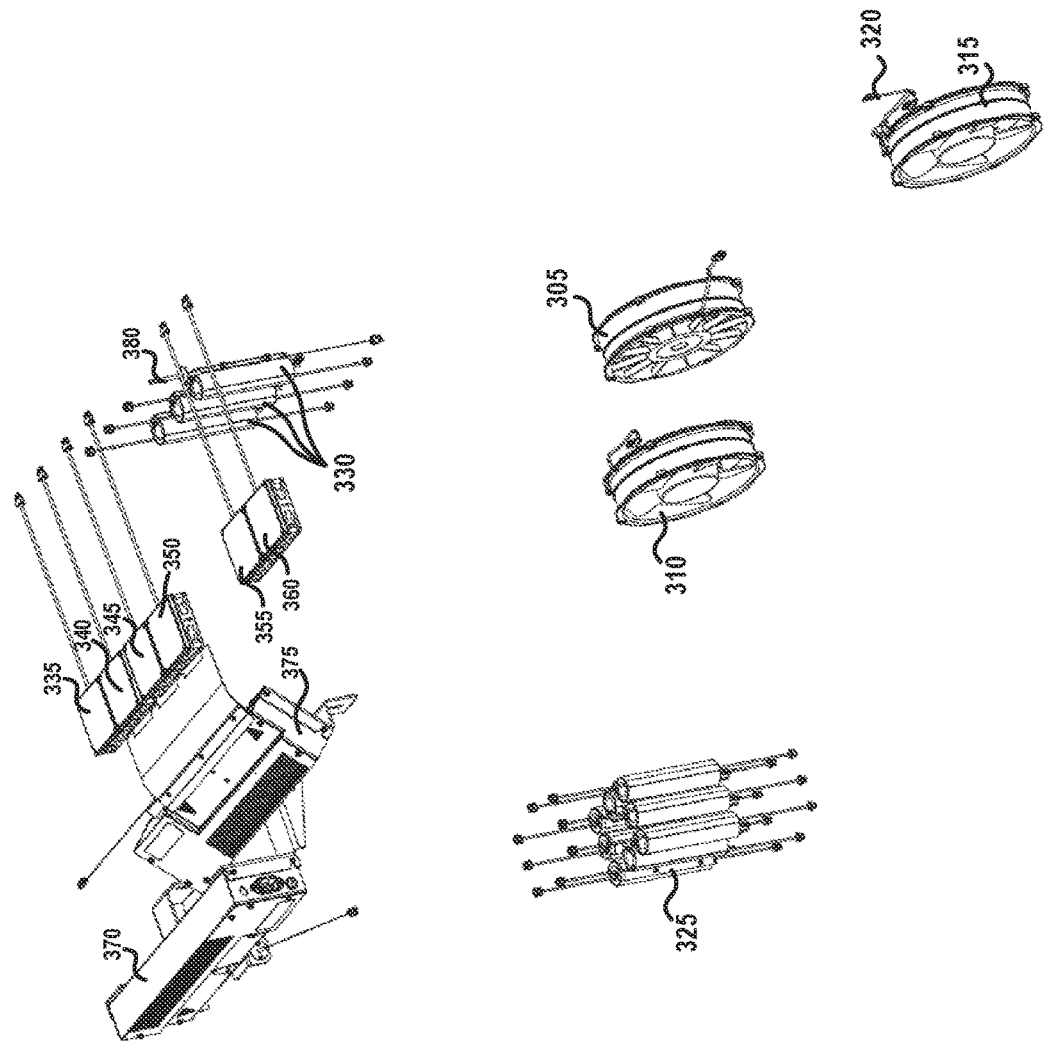
FIG. 3B provides a second schematic view of the environmental control system, according to some embodiments.
Figure 3C:
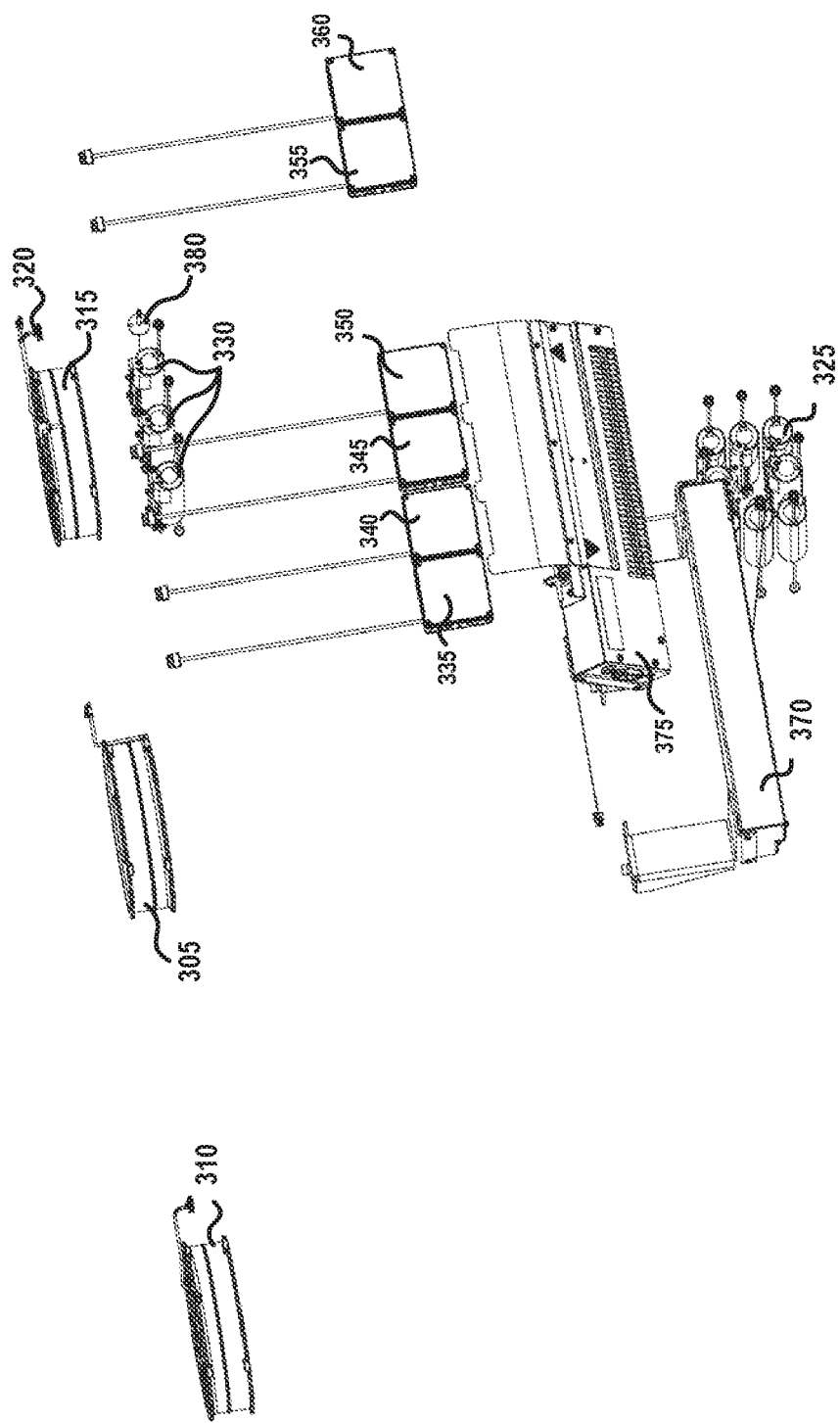
FIG. 3C provides a third schematic view of the environmental control system, according to some embodiments.

FIGS. 3A-3C provide a schematic view of the environmental control system, according to some embodiments. For clarity, the other structural elements of the clinical analyzer module are omitted. In FIG. 3A, the Exhaust Fans 310, 315 and the Inlet Fan 305 are located at the lower part of the figure. Exhaust Fan 315 includes a Thermistor 320 to monitor exhaust air temperature. The Lower Fluid Heater 325 is located at the same approximate height as the Inlet Fan 305. Spine Cooling Fans 335, 340, 345, 350, 355, and 360 are installed in a spine upper frame (not shown in FIGS. 3A-3B). Each of the Spine Cooling Fans 335, 340, 345, 350, 355, and 360 may include an air filter. The Upper Fluid Heater 330 and the Far Field Sensor 380 are located between Spine Cooling Fans 350 and 355.

Continuing with reference to FIGS. 3A-3B, the environmental control system includes Two Heater Boxes 370, 375. In some embodiments, the Heater Boxes 370, 375 include a tangential blower and electric heater. The tangential blower is powered with 24V. In some embodiments, 220 VAC heater power is utilized. The heater power is modulated to maintain a steady temperature around specified set-points using a closed loop control system. Thermistors located throughout the clinical analyzer module continuously monitor surrounding air temperature and provide a feedback signal to the heater control loop. In the example of FIGS. 3A-3C, the Far Field Sensor 380 is one of the thermistors used for temperature monitoring. Additionally, one or more near field thermistors may also be used (e.g., located next to the Heater Boxes 370, 375). Various types of thermistors may be employed with the present invention. For example, in one embodiment, 2.252 kΩ thermistors may be used.

Heater Box 370 includes a Deflector 365. This Deflector 365 may be utilized, for example, to split air flow towards certain assemblies; direct air heating towards certain assemblies; or achieve stable thermal control during cold start and warm restart conditions.

Figure 4:
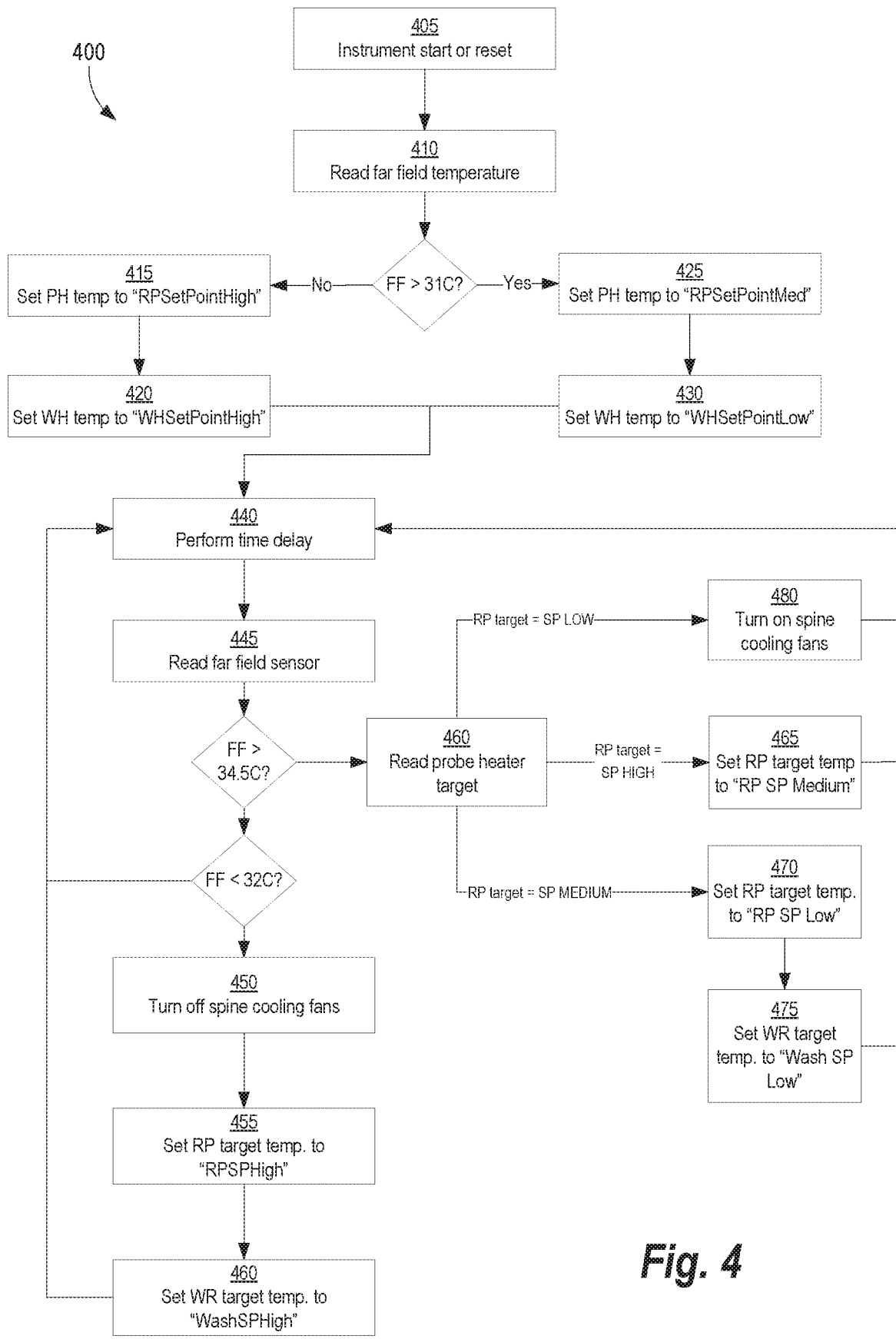
FIG. 4 illustrates an environmental control process used to regulate temperature of an upper deck environmental subsystem, according to some embodiments.

FIG. 4 illustrates an environmental control process 400 used to regulate temperature of the Upper Deck of a clinical analyzer module, according to some embodiments of the present invention. This example assumes that the temperature of the Probe Heater and the Wash Heater each have predetermined low, medium, and high set-points that may be used to specify a target temperature. These set-points may be configured, for example, by an operator of the clinical analyzer module (either locally at the module or remotely via network connected to the module). Alternatively, values may be specified for the set-points at the time of manufacture or installation of the clinical analyzer module.

Starting at step 405, the clinical analyzer module is started or reset to an initial state. Next, at step 410 the far field temperature is read from the Far Field Sensor. If the far field temperature is less than a predetermined temperature threshold value (in this example, 31 degrees Celsius), the temperature of the Probe Heater is set to a predetermined high set-point (denoted "RPSetPointHigh") at step 415 and the temperature of the Wash Heater is set to a predetermined high set-point (denoted "WHSetPointHigh") at step 420. Conversely, if the far field temperature is greater than the temperature threshold value, the temperature of the Probe Heater is set to a predetermined medium set-point (denoted "RPSetPointMed") at step 425 and the temperature of the Wash Heater is set to a predetermined low set-point (denoted "WHSetPointLow") at step 430.

Continuing with reference to FIG. 4, at steps 440-480 a temperature regulation process is performed. At step 440, the system performs a time delay by pausing operations for a predetermined period. In some embodiments, this period is five minutes. Following the time delay, at step 445, the temperature is read from the far field sensor. If the temperature is above a temperature threshold value (in this example 34.5 Celsius), one or more of steps 460-480 are performed. The target of the Probe Heater is read at step 460. If the target is "SP LOW," the Spine Cooling Fans are turned on at step 480 and the process continues back at step 440. If the target of the Probe Heater is set to a predetermined high set-point (denoted "SP HIGH,") the target temperature of the Probe Heater is set to the medium set-point (denoted "RP SP Medium") and the process continues to step 440. Finally, if the target of the probe heater is set to "SP MEDIUM," the target temperature of the Probe Heater is set to a predetermined low set-point (denoted "RP SP Low") and the target temperature of the Wash Heater is set to a predetermined low set top set-point (denoted "WASH SP Low") at steps 470 and 475, respectively, before the process 400 continues at step 440.

Continuing with reference to FIG. 4, if the temperature read from the Far Field Sensor at step 445 is less than a temperature threshold value (in this example 32 degrees Celsius), the Spine Cooling Fans are turned off at step 450. Then, the target temperature of the Probe Heater and the Wash Heater are set to their high set-points at steps 455 and 460, respectively. The process 400 then continues at step 440. Thus, the loop of steps from 440-480 is performed continually at certain time intervals until the process is terminated. The process 400 illustrated in FIG. 4 ensures fast response for cold-start and transient recovery. The loop delay is appropriate for the system response times.

Figure 5:
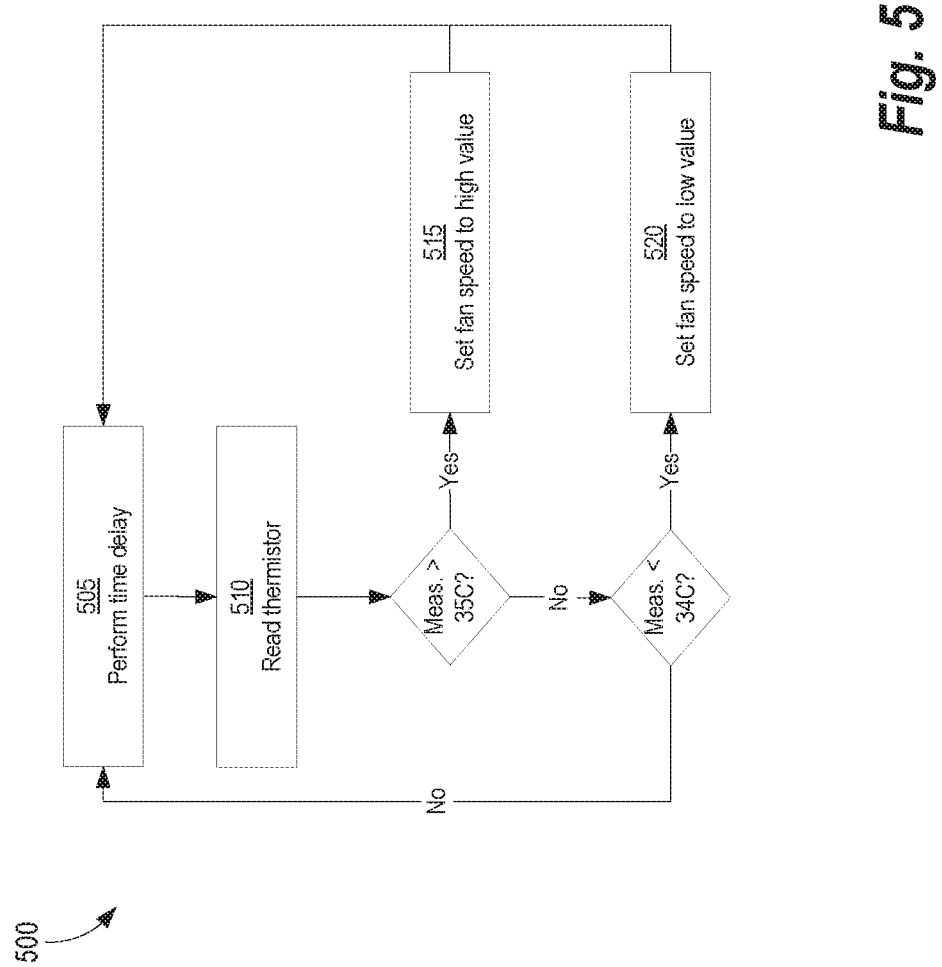
FIG. 5 illustrates a control process for the lower deck environmental subsystem, according to some embodiments.

FIG. 5 illustrates a control process 500 for the lower deck environmental subsystem, according to some embodiments. Starting a step 505, a time delay is performed to pause the control process 500. In some embodiments, this time delay is five minutes. After the time delay, the thermistor is read at step 510. If the temperature exceeds a temperature threshold value (in this example 35° C.), then the fan speed is set to a high value (e.g., 2700 rpm) at step 515 and the control process 500 repeats. If the temperature does not exceed 35° C., a determination is made as to whether the temperature is less than a second temperature threshold value (in this example 34° C.). If that is the case, the fan speed is set to a low value (e.g., 1100 rpm) at step 520 and the control process is repeated. If either of the conditions is met, the control process 500 continues at step 505 by incurring a new time delay and reevaluating the temperature.

The systems and methods provided herein have several advantages over conventional environmental control system. For example, according to some embodiments herein, precise air temperature control can be achieved with upper deck heaters turning on when an ambient air temperature is low, so module internal air is maintained between a desired range (e.g., 31° C. and 35° C.). When ambient air temperature is close to a predetermined cooling point (e.g., 30° C.), the upper and lower deck cooling fans can be turned on to condition internal air to the specified range. Moreover, fluid thermal control is achieved with upper deck fluid heaters turning on when the supply fluids temperature is low, so the module internal fluids are maintained between the specified range. When the fluids temperature is close to a predetermined cooling point, the upper deck fluid heaters turn off and the fluids thermal range is supported by internal air only.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. An environmental control system for use in clinical analyzer module, the system comprising:
    an upper deck environmental subsystem comprising:
        a far field sensor configured to acquire measurements of ambient temperature in the upper deck environmental subsystem,
        one or more heaters configured to generate hot airflow based on the measurements of ambient temperature from the far field sensor, and
        one or more spine cooling fans configured to operate in a manner that mixes the hot airflow from the heaters with cool airflow based on the measurements of ambient temperature from the far field sensor, and
        one or more in-line fluid heat exchangers configured to heat fluids used in reactions performed on the clinical analyzer module to a constant temperature;
    a lower deck environmental subsystem housing utilities, which is located in a lower environmental subsystem of the clinical analyzer module, comprising:
        one or more inlet fans configured to draw air from an operating environment of the clinical analyzer module,
        one or more exhaust fans configured to remove hot airflow from the lower deck environmental subsystem, and
        one or more lower deck sensors configured to acquire measurements of ambient temperature in the lower deck environmental subsystem.

2. The environmental control system of claim 1, wherein the clinical analyzer module performs testing of samples using reagents and the one or more heaters comprise a wash air heater configured to heat wash fluids used to separate analyte molecules in a sample from unbound reagents.

3. The environmental control system of claim 1, wherein the one or more heaters comprise a probe air heater configured to heat one or more probes used to aspirate and dispense fluids.

4. The environmental control system of claim 1, wherein the one or more exhaust fans comprise (a) a first exhaust fan located on a first of the one or more inlet fans and (b) a second exhaust fan located on a second of the one or more inlet fans.

5. The environmental control system of claim 4, wherein speed of at least one of the (a) the one or more inlet fans and (b) the one or more exhaust fans is controlled based on the measurements of ambient temperature in the lower deck environmental subsystem.

6. The environmental control system of claim 4, wherein the one or more lower deck sensors comprise a thermistor coupled to the first exhaust fan.

7. An environmental control system for use in clinical analyzer module, the system comprising:
- a lower deck environmental subsystem located in a lower environmental subsystem of the clinical analyzer module, wherein the lower deck environmental subsystem comprises:
  - one or more inlet fans configured to draw air from an operating environment of the clinical analyzer module, and
  - one or more exhaust fans configured to remove hot airflow from the lower deck environmental subsystem.

8. The environmental control system of claim 7, further comprising one or more lower deck sensors configured to acquire a temperature measurement of ambient temperature in the lower deck environmental subsystem.

9. The environmental control system of claim 8, wherein the one or more exhaust fans are configured to operate at a plurality of speed settings and the environmental control system further comprises one or more controllers configured to:
- set the one or more exhaust fans to a predetermined high fan speed if the measurement of ambient temperature in the lower deck environmental subsystem is above a first temperature threshold value; and
- set the one or more exhaust fans to a predetermined low fan speed if the measurement of ambient temperature in the lower deck environmental subsystem is below a second temperature threshold value.

10. The environmental control system of claim 9, wherein the first temperature threshold value is 35 degrees Celsius and the second temperature threshold value is 34 degrees Celsius.

* * * * *